(12) United States Patent
Saiki et al.

(10) Patent No.: US 10,014,743 B2
(45) Date of Patent: Jul. 3, 2018

(54) ELECTRIC MOTOR

(71) Applicant: KOBELCO CONSTRUCTION MACHINERY CO., LTD., Hiroshima-shi (JP)

(72) Inventors: Seiji Saiki, Hiroshima (JP); Kazushige Koiwai, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 229 days.

(21) Appl. No.: 14/969,124

(22) Filed: Dec. 15, 2015

(65) Prior Publication Data
US 2016/0218582 A1   Jul. 28, 2016

(30) Foreign Application Priority Data

Jan. 26, 2015 (JP) .................................. 2015-012190

(51) Int. Cl.
| | |
|---|---|
| *H02K 5/16* | (2006.01) |
| *H02K 5/173* | (2006.01) |
| *H02K 7/08* | (2006.01) |

(52) U.S. Cl.
CPC ........... *H02K 5/161* (2013.01); *H02K 5/1732* (2013.01); *H02K 7/083* (2013.01); *F16C 2380/26* (2013.01)

(58) Field of Classification Search
CPC ........ H02K 5/161; H02K 5/16; H02K 5/1732; H02K 5/1735; H02K 5/1737; H02K 5/173; H02K 7/083; H02K 7/085; H02K 7/086; H02K 7/088; H02K 7/08

USPC ...................................................... 310/90, 89
See application file for complete search history.

(56) References Cited

U.S. PATENT DOCUMENTS

| | | |
|---|---|---|
| 2007/0273229 A1 | 11/2007 | Lan et al. |
| 2009/0091201 A1* | 4/2009 | Scherzinger ............ F16C 19/52 310/86 |
| 2011/0084561 A1* | 4/2011 | Swales .................... H02K 9/19 310/54 |

FOREIGN PATENT DOCUMENTS

| | | |
|---|---|---|
| JP | 7-248023 | 9/1995 |
| JP | 2006-97765 | 4/2006 |
| JP | 2009-220771 | 10/2009 |

OTHER PUBLICATIONS

Extended European Search Report dated Jun. 3, 2016 in Patent Application No. 15201903.0.

* cited by examiner

*Primary Examiner* — Terrance Kenerly
(74) *Attorney, Agent, or Firm* — Oblon, McClelland, Maier & Neustadt, L.L.P.

(57) ABSTRACT

Provided is an electric motor capable of stabilizing a preload applied to a bearing by an annular spring and effectively retarding degradation of the annular spring. The electric motor includes a motor shaft, a rotor, a stator, a housing containing the rotor and the stator in a posture where the motor shaft extends vertically, an upper bearing and a lower bearing supporting the motor shaft, and an annular spring applying a downward preload to the upper bearing. The lower bearing is fixed to the motor shaft and the housing. The housing has a load-receiving surface receiving an upward thrust load overcoming the preload from the upper bearing.

5 Claims, 6 Drawing Sheets

ELECTRIC MOTOR

TECHNICAL FIELD

The present invention relates to an electric motor including a rotor and a bearing rotatably supporting the rotor.

BACKGROUND ART

Heretofore, there has been known an electric motor including a rotor and a bearing rotatably supporting the rotor, wherein an axial load is preliminarily applied to the bearing as a preload (as used in this specification, the term "electric motor" has a concept including a generator and a generator-motor which are based on the same principle as that of an electric motor). The applied preload eliminates gaps between elements which constitute the bearing, thereby enhancing the rigidity of the entire bearing. Each of JP 07-248023A (Patent Literature 1) and JP 2006-97765 (Patent Literature 2) discloses a technique of applying the preload to a bearing by use of an annular spring. The annular spring is a ring-shaped leaf spring fabricated to have a circumferentially wave.

Either of the techniques disclosed in the Patent Literatures 1 and 2 is, however, incapable of positively restraining the bearing from a vertical movement, i.e., wobbling in a thrust direction. Particularly, in a vertical electric motor, more particularly, in a vertical electric motor to be installed on a vehicle such as a hydraulic excavator, it is likely to occur that a vertical load, i.e., a thrust load, due to vibrations or the like acts on the bearing to bring the bearing into vertical movement, which generates repeated large flexural deformation in the annular spring to thereby accelerate degradation of the annular spring. Moreover, the flexural deformation and degradation of the annular spring can make the magnitude of the preload deviate from an adequate range to exert a negative influence on the bearing itself.

SUMMARY OF INVENTION

It is an object of the present invention to provide an electric motor capable of stabilizing a preload applied to a bearing supporting a rotor by an annular spring and effectively retarding degradation of the annular spring. Provided is an electric motor including: a motor shaft; a rotor attached to the motor shaft so as to be rotated about the motor shaft; a stator disposed around of the rotor; a housing containing the rotor and the stator in a posture where the motor shaft vertically extends; an upper bearing retained by the housing to rotatably support an upper portion of the motor shaft, the upper portion being on upper side of the rotor; a lower bearing retained by the housing to rotatably support a lower portion of the motor shaft, the lower portion being on lower side of the rotor; and an annular spring applying a downward preload to the upper bearing. The lower bearing is fixed to the motor shaft and the housing to be restrained from axial displacement relative to the motor shaft and the housing. The housing has a load-receiving surface receiving an upward thrust load from the upper bearing, the upward thrust load overcoming the preload.

DESCRIPTION OF EMBODIMENTS

In advance of description about various embodiments of the present invention, there will be described a reference example for explanation of the embodiments, with reference to FIG. 8.

Figure 8:
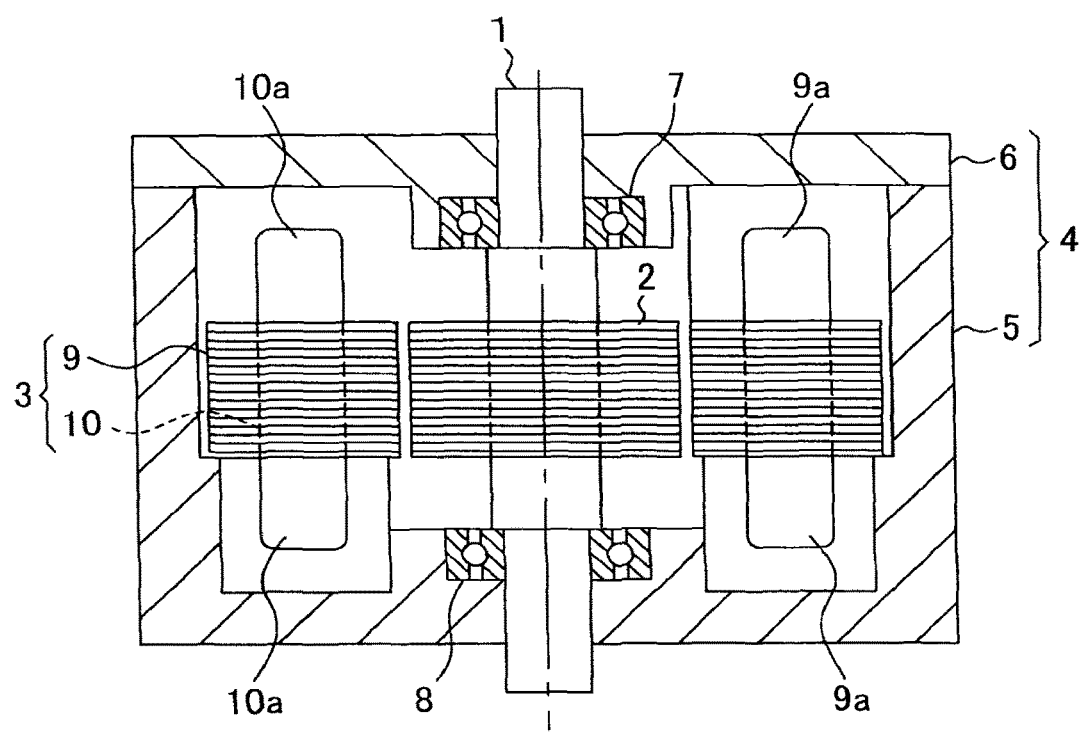
FIG. 8 is a sectional front view illustrating an electric motor of a reference example for explanation of the embodiments of the present invention.

FIG. 8 illustrates a vertical electric motor, which is used as a drive source for slewing driving in a hydraulic excavator. The electric motor includes: a motor shaft 1 extending vertically; a rotor 2 configured to be rotated integrally with the motor shaft 1 about the motor shaft 1; a stator 3 disposed around an outer periphery of the rotor 2; a housing 4 containing the rotor 2 and the stator 3; an upper bearing 7; and a lower bearing 8.

The housing 4 includes a housing body 5 and a top cover member 6. The housing body 5 has an upper end and a lower end, the upper end defining an opening inside the upper end. The top cover member 6, which is also referred to as "end cover" or "motor cover", is mounted to the housing body 5 with a non-illustrated bolt, so as to close the opening.

The motor shaft 1 has an upper portion and a lower portion. The upper portion is rotatably supported by the top cover member 6 through the upper bearing 7, and the lower portion is rotatably supported by a bottom portion of the housing body 5 through the lower bearing 8. Each of the upper and lower bearings 7, 8 is composed, for example, of a rolling bearing, which includes an inner race, an outer race, and a plurality of balls interposed between the inner race and the outer race.

The stator 3 includes a stator core 9 and a stator coil 10. The stator core 9 is composed, for example, of a laminate of a plurality of magnetic steel sheets. The stator coil 10 is wound around the stator coil 9 so as to reciprocate vertically. The stator coil 10 has upper and lower coil ends 10a each being a turned-back portion. The upper and lower coil ends 10a protrude upward and downward beyond an upper edge face and a lower edge face of the stator core 9, respectively.

In the electric motor, it is preferable that an axial load is preliminarily applied to each of the upper and lower bearings 7, 8 as a preload. The application of the preload eliminates gaps between elements constituting each of the bearings to thereby enhance rigidity of the entire bearing. The preload can be applied, for example, by use of an annular spring, which is a ring-shaped leaf spring fabricated to have a circumferentially wave.

The electric motor according to the reference example is, however, incapable of positively restraining each of the upper and lower bearings 7, 8 from vertical movement, i.e., wobbling in a thrust direction. Particularly, in a vertical electric motor, more particularly, in a vertical electric motor installed on a vehicle such as a hydraulic excavator, it is likely to occur that a vertical load, i.e., a thrust load, due to vibrations or the like, acts on the upper and lower bearings 7, 8 to bring each of the bearings 7, 8 into vertical movement. The vertical movements of the bearings 7, 8 involve repeated large flexural deformations in the respective annular springs to thereby accelerate degradation of the annular spring. Moreover, the flexural deformation and degradation of the annular spring can make the magnitude of the preload deviate from an adequate range to thereby exert a negative influence on the bearing 7, 8 itself.

Each of electric motors according to the aftermentioned embodiments of the present invention includes means to solve the above technical problem in the reference example. There will be below described the electric motors according to respective embodiments, with reference to FIGS. 1 to 7.

Figure 1:
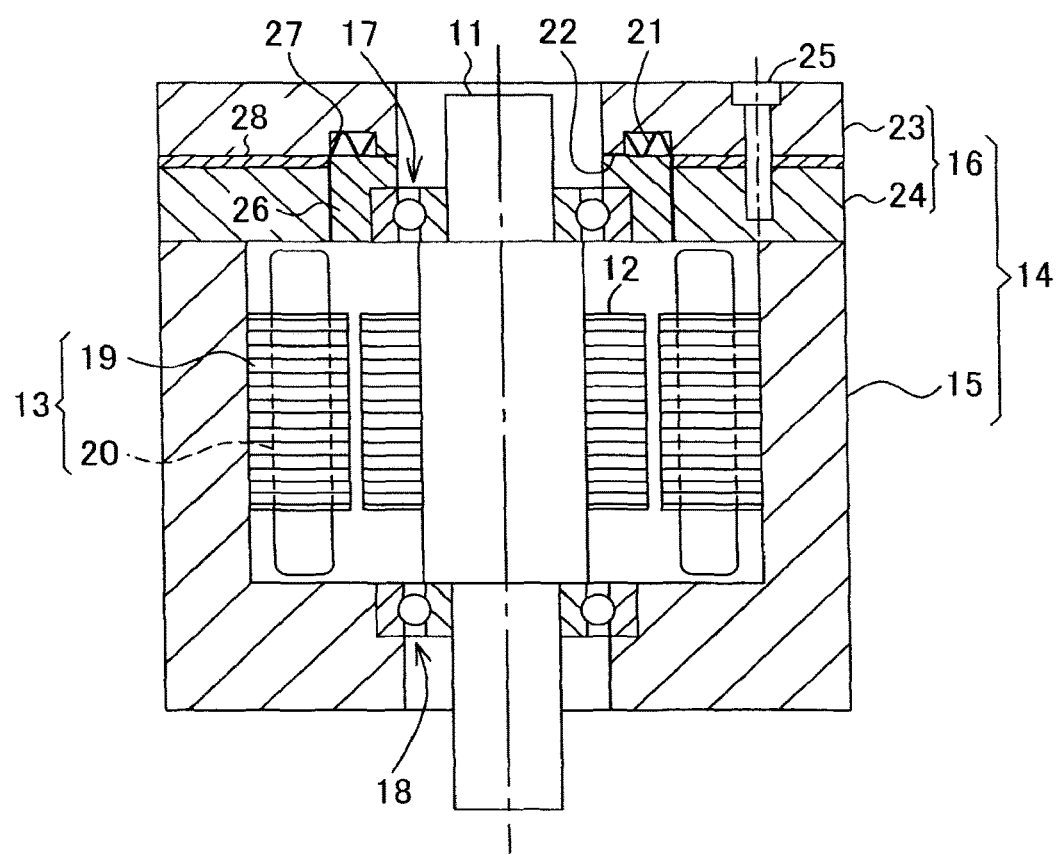
FIG. 1 is a sectional front view illustrating an electric motor according to a first embodiment of the present invention.
Figure 2:
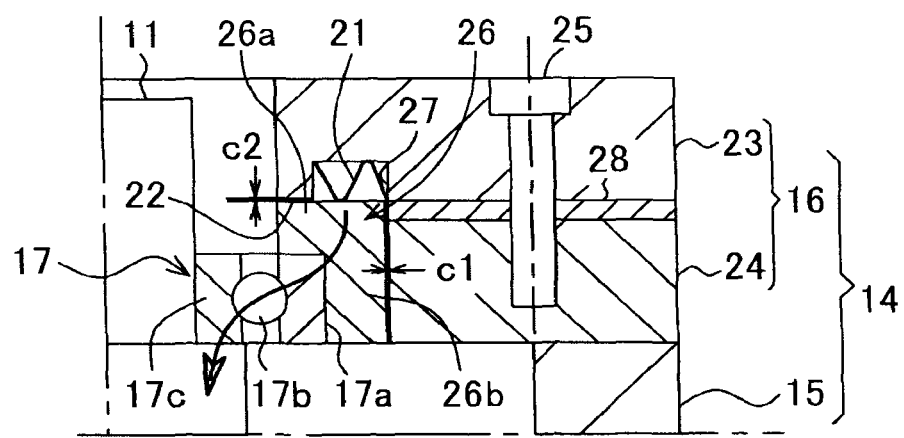
FIG. 2 is a sectional view enlargedly illustrating a substantial part of the electric motor illustrated in FIG. 1.
Figure 2:
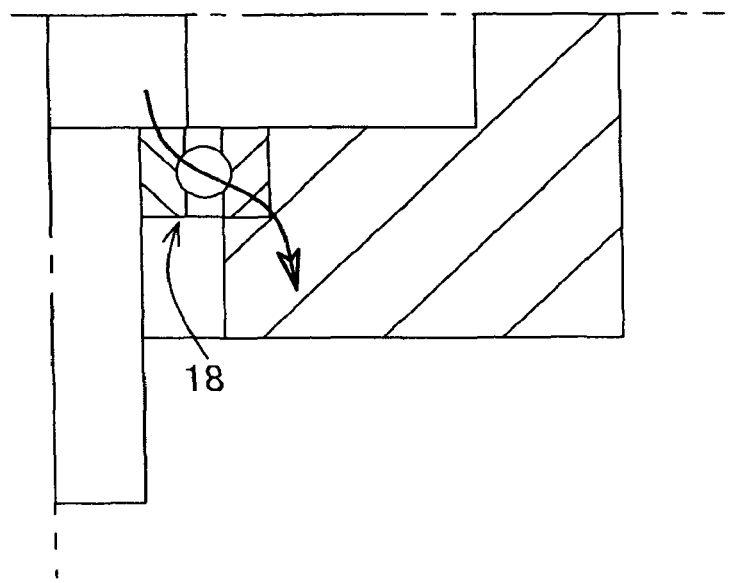

FIGS. 1 and 2 show an electric motor according to a first embodiment of the present invention. This electric motor has a configuration common with the electric motor of the reference example shown in FIG. 8 in the following points.

The electric motor includes: a motor shaft 11 extending vertically; a rotor 12 attached to the motor shaft 11 so as to be rotated integrally with the motor shaft 11 about the motor shaft 11; a stator 13 disposed around the rotor 12; a housing 14 containing the rotor 12 and the stator 13; an upper bearing 17; and a lower bearing 18. The housing 14 includes: a housing body 15 having an upper end defining an opening inside the upper end; and a top cover member 16 closing the opening. The top cover member 16 is attached to an upper end surface of the housing body 15 by a non-illustrated bolt.

The motor shaft 11 has an upper portion rotatably supported by the top cover member 16 through the upper bearing 17 and a lower portion rotatably supported by a bottom portion of the housing body 15 through the lower bearing 18. Specifically, the upper bearing 17 is retained by the top cover member 16 to rotatably support a first portion of the motor shaft 11 on an upper side of the rotor 12. The lower bearing 18 is fixed to the bottom portion of the housing body 15 to rotatably support a second portion of the motor shaft 11 on a lower side of the rotor 12. Each of the upper and lower bearings 17, 18 is formed of, for example, a rolling bearing, which includes an inner race, an outer race located radially outward of the inner race, and a plurality of balls interposed between the inner race and the outer race. FIG. 2 illustrates an inner race 17a, an outer race 17c and one of a plurality of balls 17b, each constituting the upper bearing 17.

The stator 13 includes: a stator core 19 composed, for example, of a laminate of a plurality of magnetic steel sheets and a stator coil 20 wound around the stator coil 19 so as to reciprocate vertically. The stator coil 20 has upper and lower coil ends 20a each being a turned-back portion. The upper and lower coil ends 20a protrude upward and downward beyond the upper and lower edge faces of the stator core 19, respectively.

Next will be described details of the electric motor according to the first embodiment.

In the first embodiment, the lower bearing 18 is fixed to each of the motor shaft 11 and the housing body 15 of the housing 14 by means of shrink-fitting, thus being restrained from axial displacement relative to the motor shaft 11 and the housing body 15.

The electric motor further includes an annular spring 21. The annular spring 21 is disposed so as to apply a downward axial load to the upper bearing 17 as a preload. The top cover member 16 of the housing 14 has a load-receiving surface 22. The load-receiving surface 22 receives an upward thrust load overcoming the preload, from the upper bearing 17. The load-receiving surface 22 restrains the upper bearing 17 from axial movement.

The top cover member 16 is vertically divided into an upper cover 23 and a lower cover 24. The upper and lower cover 23, 24 are vertically laminated mutually and joined together at a plurality of circumferentially-arranged spots by respective bolts 25. Each of the bolts 25, if being long enough to vertically pass through the entire top cover member 16, can be additionally used as the bolt for fixing the top cover member 16 to the housing body 15.

This electric motor further includes an insert member 26. The insert member 26 is located at radially outer side of the upper bearing 17 so as to surround the upper bearing 17. The insert member 26 integrally includes a top wall portion 26a covering an upper surface of the outer race 17a of the upper bearing 17 and a peripheral wall portion 26b covering an outer peripheral surface of the outer race 17a, with a flat upper surface across the top wall portion 26a and the top end of the peripheral wall portion 26b. The insert member, for example, has an inverted L-shaped cross-section. The insert member 26 is attached to the upper bearing 17 on the following conditions: (i) the peripheral wall portion 26b is interposed between the outer peripheral surface of the outer race 17a and an inner peripheral surface of the lower cover 24; (ii) the top wall portion 26a is interposed between the upper surface of the outer race 17c and a lower surface of the upper cover 23; and (iii) a sliding-permission gap c1 is formed between an outer peripheral surface of the peripheral wall portion 26b and the inner peripheral surface of the lower cover 24, as illustrated in FIG. 2, the gap c1 permitting the peripheral wall portion 26b to slide axially with respect to the inner peripheral surface of the lower cover 24.

The upper cover 23 is formed with a spring housing recess 27. The spring housing recess 27 is formed by depressing the lower surface of the upper cover 23 upward in a region thereof, the region opposed to the upper surface of the insert member 26 and located adjacent to the inner periphery of the upper cover 23 at radially outer side of the inner periphery, beyond the remaining region. The annular spring 21 is housed in the spring housing recess 27. The load-receiving surface 22 is the lower surface of the inner peripheral portion region of the upper cover 23, that is, the lower surface of the region adjacent of the spring housing recess 27 at radially inner side thereof. The load-receiving surface 22 is located radially adjacent to the annular spring 21 housed in the spring housing recess 27 and located below the bottom surface (upper surface) of the spring housing recess 27.

The annular spring 21 is a ring-shaped leaf spring fabricated to have a circumferentially wave. The annular spring 21 is housed in the spring housing recess 27, involving its vertical elastic flexural deformation; the elastic returning force of the annular spring 21 is transmitted to the outer race 17a of the upper bearing 17 through the insert member 26 as a spring force which biases the outer race 17a downward. The spring force acts to form a vertical adjustment gap c2 between the load-receiving surface 22 and the upper surface of the insert member 26. In other words, there are set the depth of the spring housing recess 27, the height dimension of the annular spring 21 in its non-deformed state, a relative position of the load-receiving surface 22 to the upper surface of the insert member 26 and the like so as to form the adjustment gap c2 to be formed.

The preload thus applied to the outer race 17a of the upper bearing 17 is transmitted to the housing body 15, via the balls 17b and the inner race of the upper bearing 17, the motor shaft 11 and the lower bearing 18, in this order, as indicated by the arrowed line in FIG. 2, thereby eliminating gaps between elements constituting the upper bearing 17 to enhance rigidity of the entire upper bearing 17.

A downward thrust load applied to the motor shaft 11 is received by the housing 14 through the lower bearing 18 fixed to the housing body 15 of the housing 14, while an upward thrust load overcoming the spring force of the annular spring 21 to bring the insert member 26 on the upper bearing 17 into contact with the load-receiving surface 22 is transmitted to the upper cover 23 of the top cover member 16 of the housing 14, via the upper bearing 17, the insert member 26 and the load-receiving surface 22, in this order, thereby received by the housing 14. The upper bearing 17 is thus restrained from an axial movement due to the thrust loads so as to limit the axial movement within the adjustment gap c2. This makes it possible to stabilize the preload applied to the upper bearing 17 by the annular spring 21 while effectively retarding the degradation of the annular spring 21 due to repetition of its large flexural deformation.

As above, the amount of the axial movement of the upper bearing 17 depends on the adjustment gap c2 between the insert member 26 and the upper cover 23. For this reason, it is desirable that the adjustment gap c2 is set to a value as small as possible within a condition where the set value allows a given preload based on the annular spring 21 to be ensured; ideally set to 0.

The electric motor according to the first embodiment further includes at least one shim 28 for adjusting the preload to be applied by the annular spring 21 and adjusting the adjustment gap c2. The shim 28 makes up the top cover member 16, which is an end cover, together with the upper and lower covers 23, 24. The shim 28 is interposed between respective surfaces of the upper and lower covers 23, 24, the surfaces being opposed to each other, that is, interposed between the lower surface of the upper cover 23 and an upper surface of the lower cover 24. Selecting the thickness of the shim 28 and/or the number of the shims 28 allows the vertical distance between the upper and lower covers 23, 24, i.e., the vertical position of the insert member 26 relative to that of and the upper cover 23, to be adjusted. Through this adjustment, can be adjusted the amount of the flexural deformation of the annular spring 21 and thus the preload to be applied by the annular spring 21, and the adjustment gap c2, to respective adequate values.

The level difference between respective joining surfaces of the upper and lower covers 23, 24, e.g., the level difference caused between the load-receiving surface 22 and the lower cover 24, can be checked visually or tactually; the state where the level difference is equal to 0 is usable as the reference for the adjustment of the preload and the adjustment gap c2. This facilitates operations for the adjustment.

The electric motor according to the first embodiment further allows the following advantageous effects to be obtained.

(1) The annular spring 21, applying its downward spring force to the outer race 17a of the upper bearing 17, can increase the radial distance between a center of the upper bearing 17 and the point of application of the spring force, thereby enabling the moment produced by the spring force to be increased. This makes it possible to apply a required preload to the upper bearing 17 by a relatively small spring force.

Figure 5:
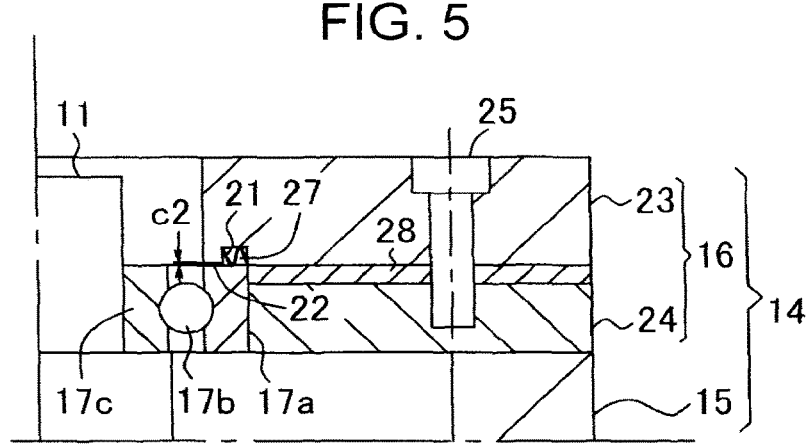
FIG. 5 is a sectional front view enlargedly illustrating a substantial part of an electric motor according to a fourth embodiment of the present invention.

(2) The ring-shaped insert member 26 is interposed between the upper bearing 17 and the assembly of the upper and lower covers 23, 24 so as to receive the spring force of the annular spring 21 and transmit the received spring force as a preload to the upper bearing 17 and so as to transmit an upward thrust load between the upper bearing 17 and the upper cover 23 of the housing 14; this allows the area of a surface usable for installation of the annular spring 21 to be enlarged as compared to the case of installing the annular spring 17 directly onto the upper surface of the outer race of the upper bearing 17 as illustrated in FIG. 5. This facilitates the installation of the annular spring 21. Particularly, according to the first embodiment, the insert member 26 has an approximately L-shaped cross-section which integrally includes the top wall portion 26a covering the upper surface of the outer race 17a of the upper bearing 17 and the peripheral wall portion 26b covering the outer peripheral surface of the outer race 17a; the annular spring 21 is housed between the upper cover 23 of the housing 14 and the upper surface, preferably, a flat upper surface, of the insert member 26 across the top wall portion 26a and the peripheral wall portion 26b; and the upper surface of the top wall portion 26a, i.e., a surface to receive the spring force of the annular spring 21, protrudes radially outwardly beyond the outer peripheral surface of the upper bearing 17. This allows the surface area for installation of the annular spring to be further increased.

The present invention is not limited to the above-described first embodiment. The present invention encompasses other embodiments, for example, the aftermentioned second to sixth embodiments. Among elements or components comprised in each of the second to sixth embodiments, any element or component overlapping with the first embodiment is assigned with the same reference sign, and the description about the overlapping section will not be repeated.

Figure 3:
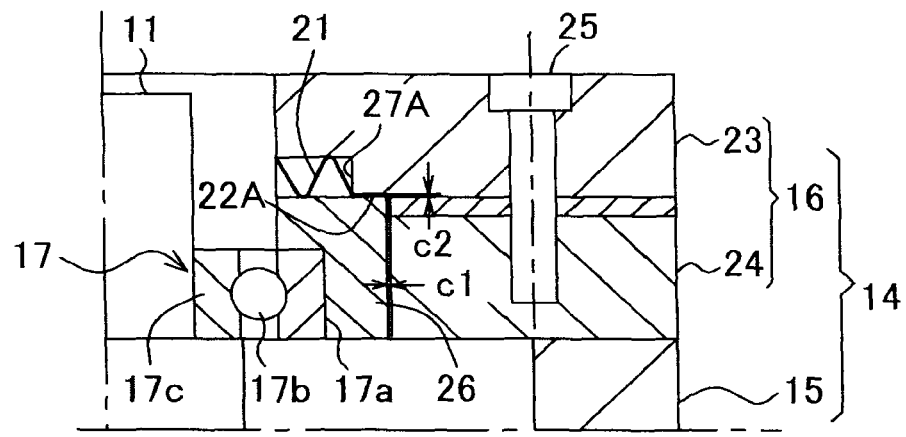
FIG. 3 is a sectional front view enlargedly illustrating a substantial part of an electric motor according to a second embodiment of the present invention.

FIG. 3 illustrates an electric motor according to the second embodiment. The second embodiment also includes a spring housing recess 27A and a load-receiving surface 22A; however, the spring housing recess 27A is formed in an inner periphery of an upper cover 23, and the load-receiving surface 22A is a lower surface of a portion of the upper cover 23, the portion being radially outward of the spring housing recess 27A.

Figure 4:
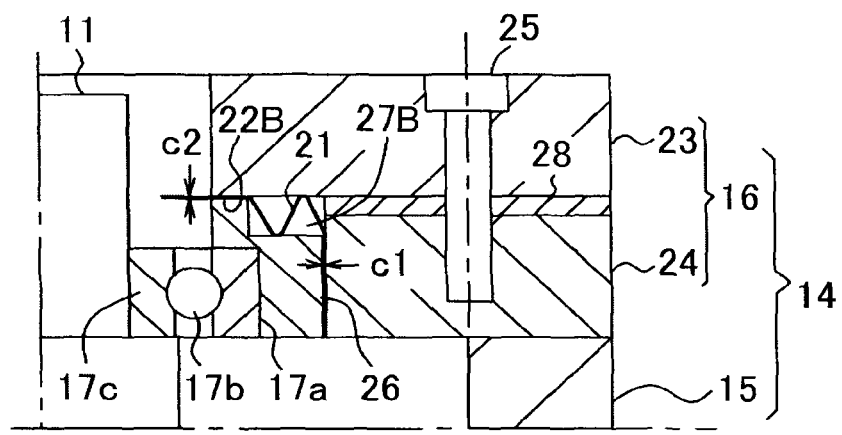
FIG. 4 is a sectional front view enlargedly illustrating a substantial part of an electric motor according to a third embodiment of the present invention.

FIG. 4 illustrates an electric motor according to the third embodiment. The third embodiment also includes a spring housing recess 27B and a load-receiving surface 22B; however, the spring housing recess 27B is formed in an insert member 26, instead of an upper cover 23 of a top cover member 16. Specifically, the spring housing recess 27B is depressed downward beyond the other region of an upper surface of an insert member 26. The load-receiving surface 22B is a lower surface of a portion of the upper cover 23, the portion located radially inward of the spring housing recess 27B, to receive an upward thrust load transmitted from an upper bearing 17 to the insert member 26.

FIG. 5 illustrates an electric motor according to the fourth embodiment. In the fourth embodiment, the aforementioned insert member 26 is omitted. The fourth embodiment also has an annular spring 21 and a load-receiving surface 22 which are radially arranged; however, the annular spring 21 makes direct contact with the upper surface of an outer race 17a of the upper bearing 17, and the load-receiving surface 22 is opposed directly to the upper surface of the outer race 17a. This allows the spring force produced by the annular spring 21 to directly act on the upper bearing 17 without intervention of the insert member 26. Besides, an upward thrust load acting on the upper bearing 17 is also directly received by the load-receiving surface 22 without intervention of the insert member 26.

Figure 6:
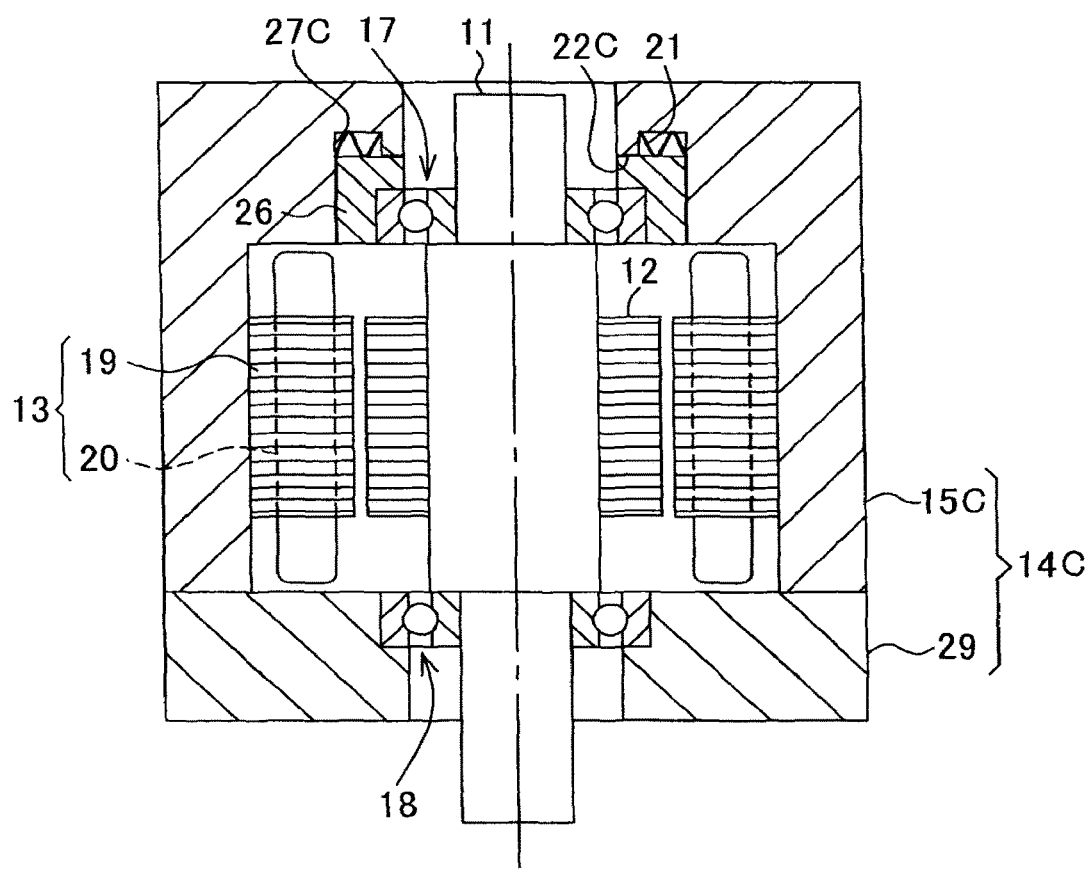
FIG. 6 is a sectional front view illustrating an electric motor according to a fifth embodiment of the present invention.

FIG. 6 illustrates an electric motor according to the fifth embodiment. The fifth embodiment also includes a housing 14C, which includes a housing body 15C and a cover member; however, the housing body 15C has a shape of defining an opening inside a lower end thereof, not inside an upper end, and the cover member is a bottom cover member 29 attached to the housing body 15C so as to close the opening defined by the lower end. The fifth embodiment also has an insert member 26, which is, however, interposed between the inner peripheral surface of the housing body 15C and the upper and outer peripheral surfaces of an upper bearing 17. The fifth embodiment also includes an annular spring 21, a spring housing recess 27C housing the annular spring 21 and a load-receiving surface 22; however, the spring housing recess 27C is formed in a region of the housing body 15C, the region being opposed to the upper surface of the insert member 26 so as to bring the annular spring 21 housed therein into contact with the upper surface of the insert member 26, and the load-receiving surface 22 is a lower surface of a portion of the housing body 15C, the portion being radially adjacent to the spring housing recess 27C. The spring housing recess 27C may be formed in the insert member 26, as with the third embodiment.

Figure 7:
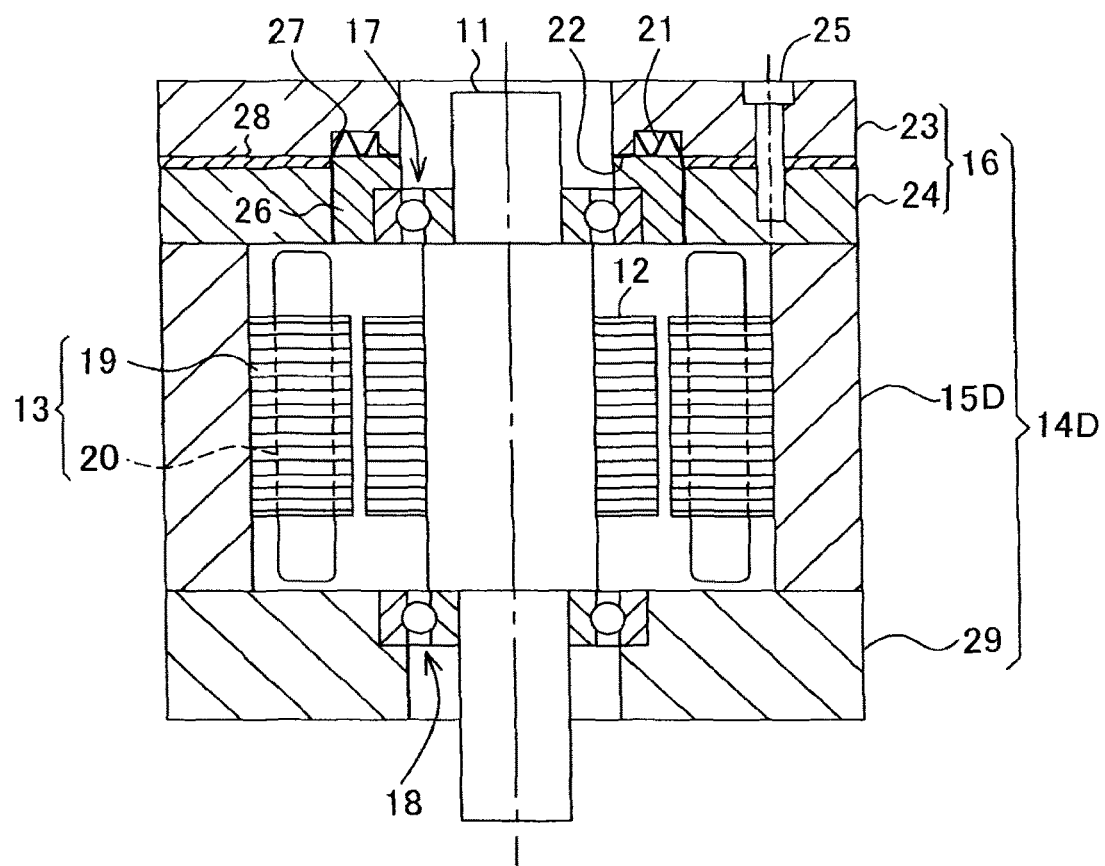
FIG. 7 is a sectional front view illustrating an electric motor according to a sixth embodiment of the present invention.

FIG. 7 illustrates an electric motor according to the sixth embodiment. The sixth embodiment also includes a housing 14D, which has a housing body 15D and a cover member; however, the housing body 15D has a tubular shape having upper and lower ends which define respective openings inside them. As the cover member, the housing includes a combination of a top cover member 16 for closing the opening defined by the upper end and a bottom cover member 29 for closing the opening surrounded by the lower end. The top cover member 16 is formed of an upper cover 23 and a lower cover 24, similarly to the first embodiment, the upper cover 23 (or the insert member 26) having a spring housing recess 27 and a load-receiving surface 22.

In the present invention, the annular spring and the load-receiving surface are not limited to ones radially adjacent to each other. The annular spring and the load-receiving surface may be radially apart from each other within a condition where the annular spring is allowed to exert a preload-application function thereof and the load-receiving surface is allowed to exert its upward-thrust-load transmission function thereof.

As described above, provided is an electric motor capable of stabilizing a preload applied to a bearing supporting a rotor by an annular spring and effectively retarding degradation of the annular spring. The electric motor includes: a motor shaft; a rotor attached to the motor shaft so as to be rotated about the motor shaft; a stator disposed around of the rotor; a housing containing the rotor and the stator in a posture where the motor shaft vertically extends; an upper bearing retained by the housing to rotatably support an upper portion of the motor shaft, the upper portion being on upper side of the rotor; a lower bearing retained by the housing to rotatably support a lower portion of the motor shaft, the lower portion being on lower side of the rotor; and an annular spring applying a downward preload to the upper bearing. The lower bearing is fixed to the motor shaft and the housing to be restrained from axial displacement relative to the motor shaft and the housing. The housing has a load-receiving surface receiving an upward thrust load from the upper bearing, the upward thrust load overcoming the preload.

In this electric motor, the downward thrust load acting on the motor shaft is supported by the housing through the lower bearing, and an upward thrust load overcoming a spring force of the annular spring is received by the load-receiving surface. This makes it possible to effectively restrain the upper and lower bearings from respective axial movements due to the thrust loads, thereby stabilizing a preload applied to the bearing, while effectively suppressing early-stage degradation of the annular spring due to repetition of the large flexural deformation thereof.

It is preferable that: the housing includes a housing body having an upper end and a lower end, the upper end being formed to define an opening inside the upper end, and a cover member attached to the housing body so as to close the opening defined inside the upper end; and the cover member includes an upper cover having the load-receiving surface, a lower cover located under the upper cover, and a shim interposed between the upper cover and the lower cover. The cover member can involve an adjustable distance between the upper cover and the lower cover; for example, the distance can be adjusted by selecting thickness of the shim and/or the number of the shims. Through this adjustment, the amount of deformation of the annular spring and thus the preload to be applied from the annular spring to the upper bearing can be adjusted to an adequate value, and the gap between the load-receiving surface and the surface opposed to the load-receiving surface also can be adjusted to an adequate value.

In the case of the upper bearing including an inner race and an outer race located radially outward of the inner race, it is preferable that the annular spring is disposed so as to apply a downward spring force to the outer race of the upper bearing. The application of the spring force to the outer race enables the radial distance between the center of the upper bearing and the point of application of the preload to be increased to thereby increase the moment produced by the preload. Thus, a required preload is allowed to be obtained by a relatively small spring force of the annular spring.

It is more preferable that the electric motor further includes a ring-shaped insert member interposed between the upper bearing and the housing so as to make a transmission of the preload from the annular spring to the upper bearing and a transmission of the upward thrust load between the upper bearing and the housing. The interposition of the insert member between the upper bearing and the housing allows the area of a surface usable for installation of the annular spring to be increased, thereby facilitating the installation of the annular spring.

In this case, it is desirable that: the insert member includes a top wall portion covering an upper surface of the outer race of the upper bearing and a peripheral wall portion covering an outer peripheral surface of the outer race; and the annular spring is disposed between the housing and an upper surface of the insert member, the upper surface extending across the top wall and the peripheral wall. This arrangement allows the upper surface of the insert member including the peripheral wall located radially outward of the outer race to be protruded radially outward beyond the outer peripheral surface of the upper bearing, which allows the installation area of the annular spring to be increased.

This application is based on Japanese Patent application No. 2015-012190 filed in Japan Patent Office on Jan. 26, 2015 the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An electric motor comprising:
a motor shaft;
a rotor attached to the motor shaft so as to be rotated about the motor shaft;
a stator disposed around of the rotor;
a housing containing the rotor and the stator in a posture where the motor shaft vertically extends;
an upper bearing retained by the housing to rotatably support an upper portion of the motor shaft, the upper portion being on an upper side of the rotor;
a lower bearing retained by the housing to rotatably support a lower portion of the motor shaft, the lower portion being on a lower side of the rotor; and
an annular spring applying a downward preload to the upper bearing, wherein:
the lower bearing is fixed to the motor shaft and the housing to be restrained from axial displacement relative to the motor shaft and the housing;
the housing has a load-receiving surface receiving an upward thrust load from the upper bearing, the upward thrust load overcoming the preload;
the annular spring and the load-receiving surface are disposed on an upper side of the upper bearing;
the annular spring and the load-receiving surface are arranged side by side in a radial direction of the annular spring; and
the electric motor further comprises an insert member which is housed in the housing to be capable of sliding in a vertical direction, the insert member having a preload-transmitting portion and a thrust-load-transmitting portion, the preload-transmitting portion being a portion interposed between the upper bearing and the annular spring so as to transmit the downward preload from the annular spring to the upper bearing, the thrust-load-transmitting portion being a portion interposed between the upper bearing and the load-receiving surface so as to transmit the upward thrust load from the upper bearing to the load-receiving surface.

2. The electric motor as recited in claim 1, wherein the housing includes a housing body having an upper end and a lower end, the upper end being formed to define an opening inside the upper end, and a cover member attached to the housing body so as to close the opening defined inside the upper end; and the cover member includes an upper cover having the load-receiving surface, a lower cover located under the upper cover, and a shim interposed between the upper cover and the lower cover.

3. The electric motor as recited in claim 1, wherein the upper bearing includes an inner race and an outer race located radially outward of the inner race, and the annular spring is disposed so as to apply a downward spring force to the outer race of the upper bearing.

4. The electric motor as recited in claim 1, wherein: the insert member includes a top wall portion covering an upper surface of an outer race of the upper bearing and a peripheral wall portion covering an outer peripheral surface of the outer race; and the annular spring is disposed between the housing and an upper surface of the insert member, the upper surface extending across the top wall and the peripheral wall.

5. The electric motor as recited in claim 1, wherein the insert member has an inverted L-shaped cross-section.

* * * * *